US008998089B2

(12) United States Patent
Chen et al.

(10) Patent No.: US 8,998,089 B2
(45) Date of Patent: Apr. 7, 2015

(54) METHOD OF CONTROLLING ILLUMINATION PULSES TO INCREASE DYNAMIC RANGE IN BIOPTIC IMAGER BARCODE SCANNER

(71) Applicant: Symbol Technologies, Inc., Schaumburg, IL (US)

(72) Inventors: Caihua (Lucy) Chen, Albany, NY (US); Edward D. Barkan, Miller Place, NY (US); Chinh Tan, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/792,564

(22) Filed: Mar. 11, 2013

(65) Prior Publication Data

US 2014/0183263 A1   Jul. 3, 2014

Related U.S. Application Data

(60) Provisional application No. 61/748,476, filed on Jan. 3, 2013.

(51) Int. Cl.
*G06K 7/00*     (2006.01)
*G06K 7/10*     (2006.01)
*G06K 7/14*     (2006.01)

(52) U.S. Cl.
CPC .......... *G06K 7/10752* (2013.01); *G06K 7/1096* (2013.01); *G06K 7/1408* (2013.01)

(58) Field of Classification Search
CPC .......................... G06K 7/10752; G06K 7/1096
USPC .................. 235/440, 454, 462.14, 462.32
See application file for complete search history.

(56) References Cited

U.S. PATENT DOCUMENTS

| 2,655,085 | A | | 10/1953 | Blake et al. | |
|---|---|---|---|---|---|
| 5,770,848 | A | * | 6/1998 | Oizumi et al. | 235/462.14 |
| 6,457,644 | B1 | * | 10/2002 | Collins et al. | 235/462.14 |
| 7,303,126 | B2 | * | 12/2007 | Patel et al. | 235/454 |
| 7,657,127 | B2 | | 2/2010 | Lolacono et al. | |
| 8,146,821 | B2 | * | 4/2012 | Barkan et al. | 235/462.24 |

(Continued)

FOREIGN PATENT DOCUMENTS

WO     2010036277 A1     4/2010

OTHER PUBLICATIONS

International Search Report and Written Opinion dated Apr. 4, 2014 in counterpart application PCMS2013/078269.

*Primary Examiner* — Seung Lee
(74) *Attorney, Agent, or Firm* — Nong-Qiang Fan

(57) ABSTRACT

A method for controlling a workstation includes the following: (1) energizing a first illuminator to illuminate a first subfield of view with a first illumination pulse and subsequently energizing the first illuminator to illuminate the first subfield of view with a second illumination pulse; (2) exposing the array of photosensitive elements in the imaging sensor for a first sensor-exposure time and subsequently exposing the array of photosensitive elements in the imaging sensor for a second sensor-exposure time; and (3) processing an image captured by the imaging sensor to decode a barcode in the image. The first illumination pulse overlaps with the first sensor-exposure time for a first overlapped-pulse-duration, and the second illumination pulse overlaps with the second sensor-exposure time for a second overlapped-pulse-duration. The first overlapped-pulse-duration is different from the second overlapped-pulse-duration.

20 Claims, 17 Drawing Sheets

(56) References Cited

U.S. PATENT DOCUMENTS

| | | |
|---|---|---|
| 8,579,197 B2 * | 11/2013 | Patel et al. ............... 235/462.14 |
| 2005/0023350 A1 | 2/2005 | Keithley |
| 2009/0001163 A1 | 1/2009 | Barkan et al. |
| 2009/0236426 A1 | 9/2009 | Barkan et al. |
| 2010/0078479 A1 | 4/2010 | Epshteyn |
| 2010/0090007 A1 | 4/2010 | Wang et al. |
| 2010/0102129 A1 | 4/2010 | Drzymala et al. |
| 2012/0273572 A1 | 11/2012 | Drzymala et al. |

* cited by examiner

METHOD OF CONTROLLING ILLUMINATION PULSES TO INCREASE DYNAMIC RANGE IN BIOPTIC IMAGER BARCODE SCANNER

RELATED APPLICATIONS

The present application is related to claims benefit under 35 U.S.C. §119(e) from U.S. Provisional Patent Application Ser. No. 61/748,476, filed Jan. 3, 2013, titled "Method of Controlling Illumination Pulses to Increase Dynamic Range in Bioptic Imager Barcode Scanner", the entire contents of which being incorporated herein by reference.

FIELD OF THE DISCLOSURE

The present invention relates to imaging-based barcode readers.

BACKGROUND

It is known to use laser-based and/or imaging-sensor-based readers or scanners in a dual window or bi-optical workstation to electro-optically read indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products are typically slid or moved by a user across, or presented to a central region of, a generally horizontal window that faces upwardly above the countertop and/or a generally vertical or upright window that rises above the countertop. When at least one laser scan line generated by a laser-based reader sweeps over a symbol and/or when return light from a symbol is captured over a field of view by an imaging sensor in a reader, the symbol is then processed, decoded and read, thereby identifying the product.

The symbol may be located low or high, or right to left, on the product, or anywhere in between, on any of six sides of the product. The symbol may be oriented in a "picket fence" orientation in which elongated parallel bars of a one-dimensional Universal Product Code (UPC) symbol are vertical, or in a "ladder" orientation in which the UPC symbol bars are horizontal, or at any orientation angle in between. The products may be held by the user at various tilt angles during their movement across, or presentation to, either window. The products may be positioned either in contact with, or held at a working distance away from, either window during such movement or presentation. All these factors make the symbol location variable and difficult to predict in advance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
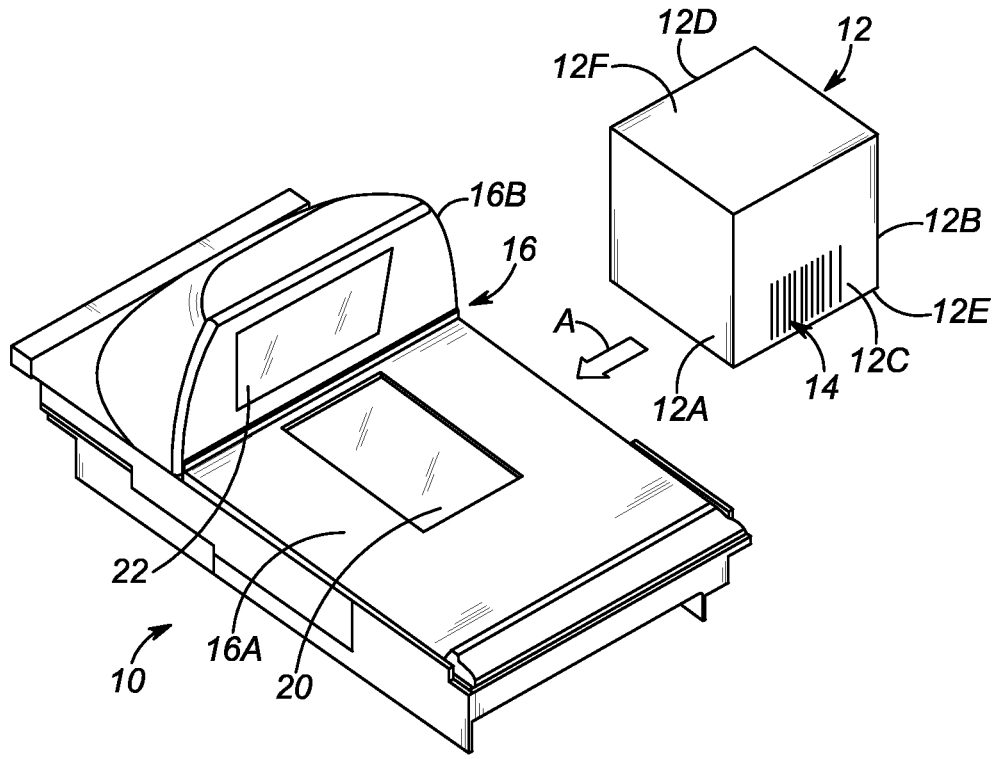
FIG. 1 is a perspective view of a dual window, bi-optical, point-of-transaction workstation or imaging reader operative for reading indicia on a multi-sided product passing through the workstation by image capture.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein

DETAILED DESCRIPTION

This invention relates to a point-of-transaction workstation for electro-optically imaging indicia associated with multi-sided products. The indicia are preferably bar code symbols that are electro-optically read in order to identify products being purchased at the workstation. In a preferred embodiment, the workstation is a bi-optical or dual window workstation having a generally horizontal window supported by a housing and located in a generally horizontal plane, and an upright window, also supported by the housing, and located in a generally upright plane that intersects the generally horizontal plane. The upright plane may lie in a vertical plane, or be slightly rearwardly or forwardly inclined relative to the vertical plane. The products are passed by an operator or a customer through a scan zone, which occupies the space at and above the horizontal window, and also occupies the space at and in front of the upright window.

At least one solid-state imaging sensor, and preferably two solid-state imaging sensors, one for, and associated with, each window, are supported by the housing. Preferably, both imaging sensors are commonly mounted on a printed circuit board. Each imaging sensor has an array of photosensitive elements (also known as pixels) with a field of view. Each imaging sensor preferably comprises a two-dimensional, charge coupled device (CCD) array, or a complementary metal oxide semiconductor (CMOS) array, of photosensitive elements of megapixel size, e.g., 1280 pixels wide×960 pixels high. The array of photosensitive elements is arranged along mutually perpendicular array axes, i.e., a row axis and a column axis. Each imaging sensor includes an imaging lens assembly for capturing return light from the indicia and for projecting the captured return light onto the array of photosensitive elements. Each imaging sensor has an electronic shutter, typically a global shutter, that exposes the imaging sensor for an exposure time, preferably pre-set for the maximum anticipated exposure time needed to capture indicia at the maximum working distance away from the window. By way of example, the maximum exposure time can be set to a value between 400-750 microseconds. Each imaging sensor preferably operates at a frame rate of sixty frames per second, each frame lasting about 16.67 milliseconds.

An optical system is supported by the housing and is operative for splitting the field of view of at least one of the imaging sensors into a plurality of subfields of view that extend through at least one of the windows over regions of the product. Preferably, the optical system includes a first optical splitter for splitting the field of view of one of the imaging sensors into three subfields of view that pass through one of the windows, and a second optical splitter for splitting the other field of view of the other imaging sensor into another three subfields of view that pass through the other of the windows. As discussed above, the use of optical splitters reduces the number of imaging sensors in the workstation. Thus, only two imaging sensors are preferably needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

A plurality of energizable illuminators, one for each subfield of view, is operative for illuminating each subfield of view with illumination light over an adjustable illumination time, preferably in a range of about 0.25 to about 0.75 milliseconds. Each illuminator preferably includes multiple illumination light sources, e.g., light emitting diodes (LEDs). The imaging lens assembly is operative for capturing the illumination light returned from the indicia in each subfield of view along respective optical paths from each window to each imaging sensor.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 measures about four inches in width by about six inches in length, while the generally upright window 22 measures about six inches in width by about eight inches in length. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10.

Figure 3:
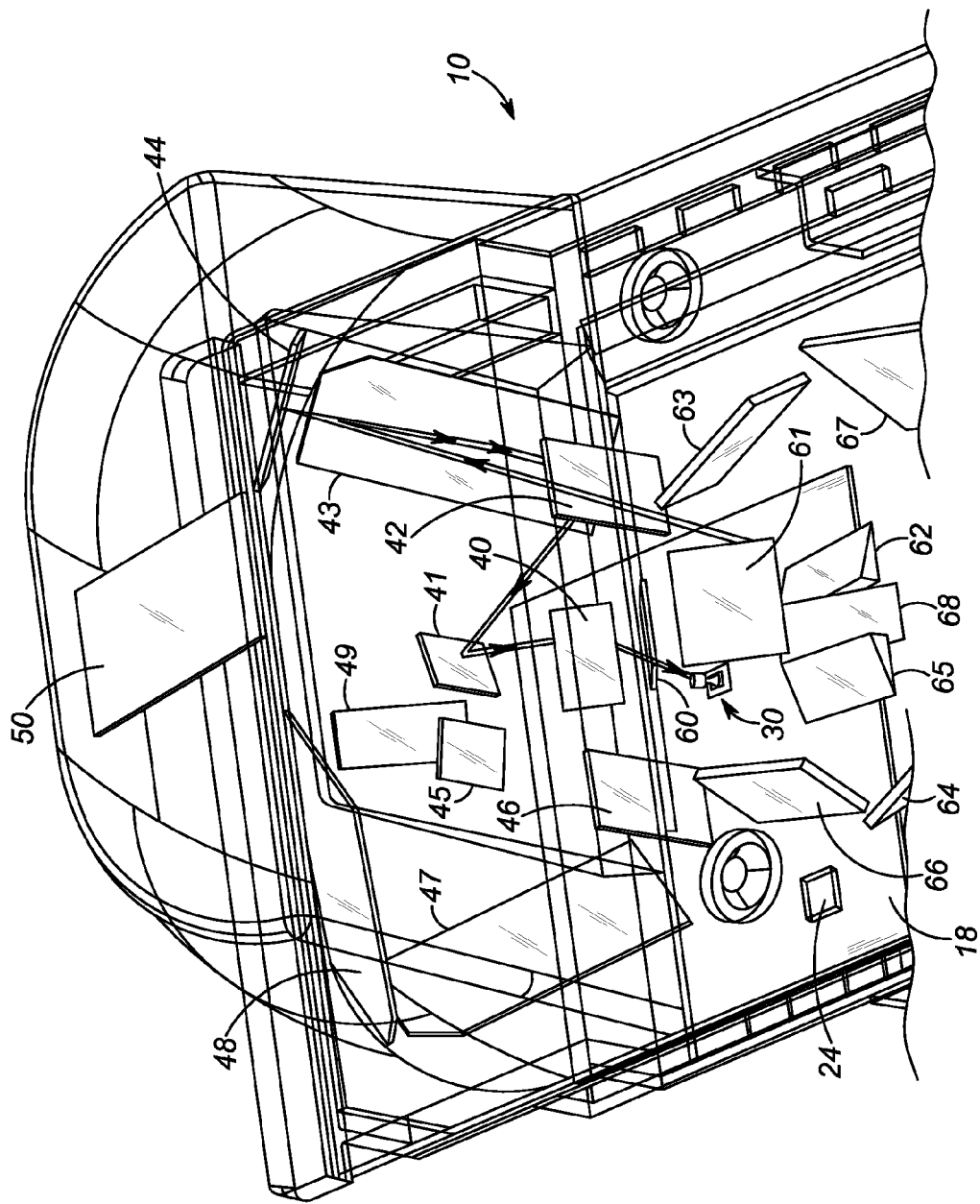
FIG. 3 is a broken-away, enlarged, perspective view of part of an optical system in the workstation of FIG. 1 diagrammatically depicting a folded optical path of an outer subfield of view of the imaging sensor of FIG. 2 for exit through an upright window.
Figure 4:
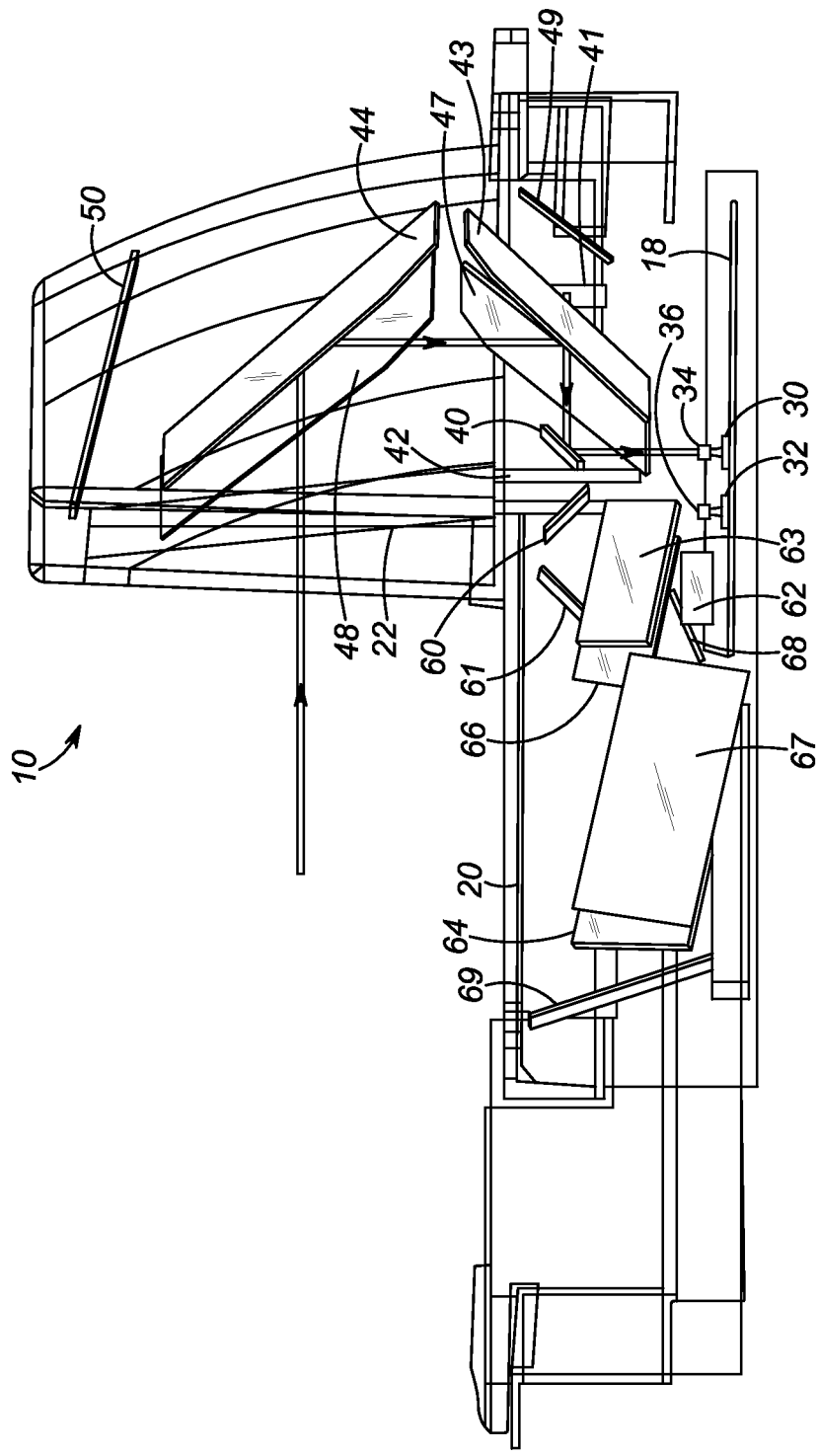
FIG. 4 is a side perspective, enlarged, view of the optical path of FIG. 3.
Figure 14:
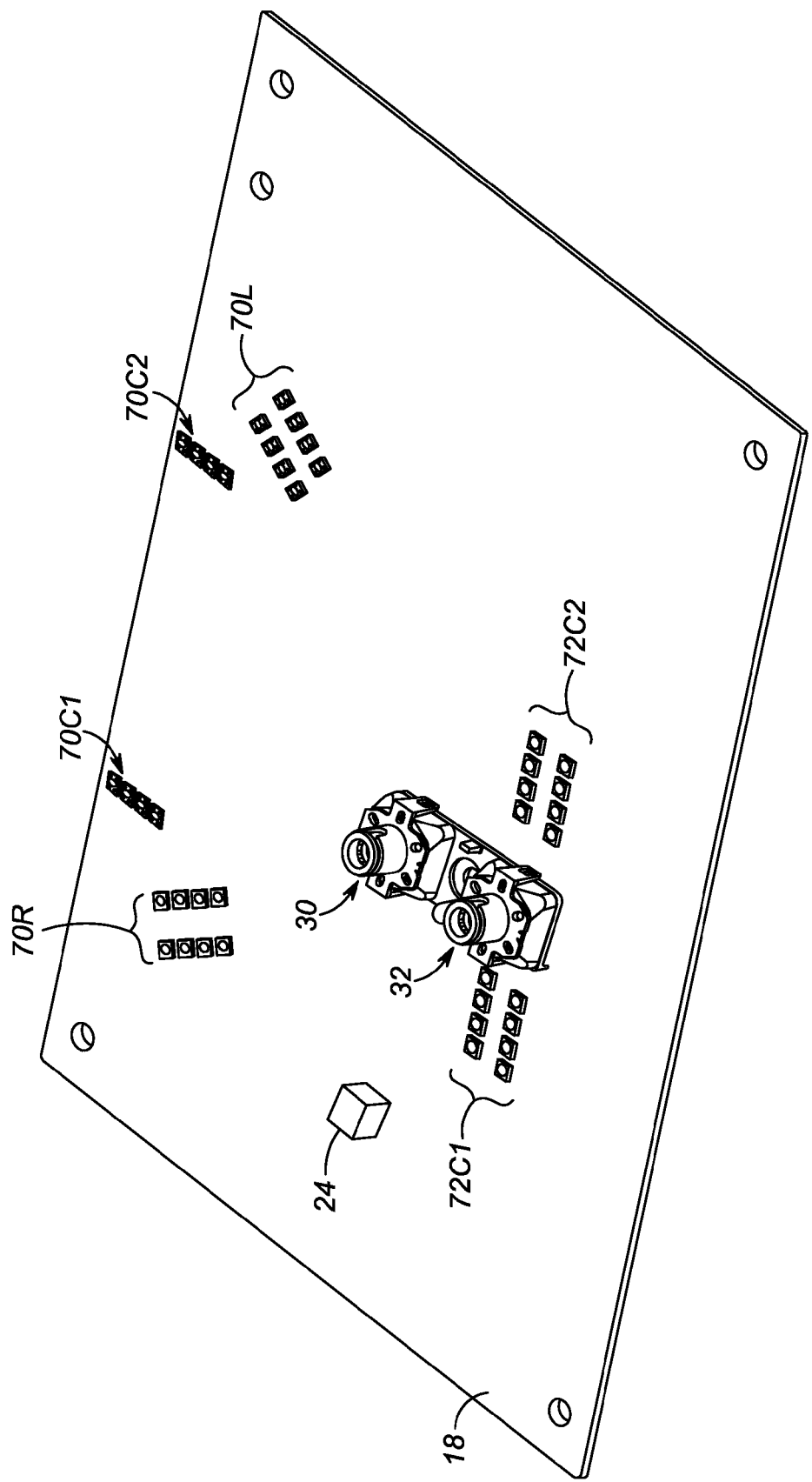
FIG. 14 is a perspective view of a plurality of illuminators and a plurality of exposure sensors commonly mounted on a main printed circuit board within the workstation of FIG. 1 in accordance with this invention.

As best shown in FIGS. 3-4, a first solid-state imaging sensor 30 and a second solid-state imaging sensor 32 are commonly supported on a printed circuit board 18 within the housing (see also FIG. 14). Each imaging sensor 30, 32 has an array of photosensitive elements with a field of view diagrammatically shown by speckles in the various views. As described below, the field of view of the first imaging sensor 30 is directed out of the upright window 22; hence, the first imaging sensor 30 will be individually referred to as the vertical imaging sensor 30 for convenience. Similarly, the field of view of the second imaging sensor 32 is directed out of the horizontal window 20; hence, the second imaging sensor 32 will be individually referred to as the horizontal imaging sensor 32 for convenience.

Figure 2:
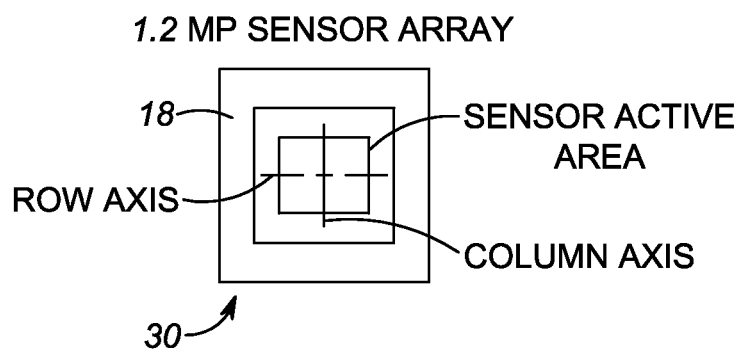
FIG. 2 is a top plan view of an array of photosensitive elements of an imaging sensor for use in the workstation of FIG. 1.

Each imaging sensor 30, 32 preferably comprises a two-dimensional, charge coupled device (CCD) array, or a complementary metal oxide semiconductor (CMOS) array, of photosensitive elements of megapixel size, e.g., 1280 pixels wide×960 pixels high. In a preferred embodiment, the field of view of each imaging sensor 30, 32 measures about 15 degrees by 30 degrees. The arrays of both imaging sensors 30, 32 extend along mutually perpendicular, row and column, directions. Thus, as shown in FIG. 2, each imaging sensor has a row axis and a column axis. Each imaging sensor 30, 32 includes an imaging lens assembly 34, 36 (see FIG. 4) for capturing return light from the indicia and for projecting the captured return light onto the respective array of photosensitive elements.

Each imaging sensor 30, 32 preferably has a shutter, typically a global shutter, that exposes each imaging sensor for an exposure time, preferably pre-set for the maximum anticipated exposure time needed to capture indicia at the maximum working distance away from each window. By way of example, the maximum exposure time can be set to a value between 400-750 microseconds. Each imaging sensor preferably operates at a frame rate of sixty frames per second, each frame lasting about 16.67 milliseconds. The shutter insures that the captured images will not be disturbed by motion of the indicia 14 relative to the window(s) during the exposure time. The indicia 14 can be presented or swiped at speeds up to around 100 inches per second across any part of either window.

Figure 13:
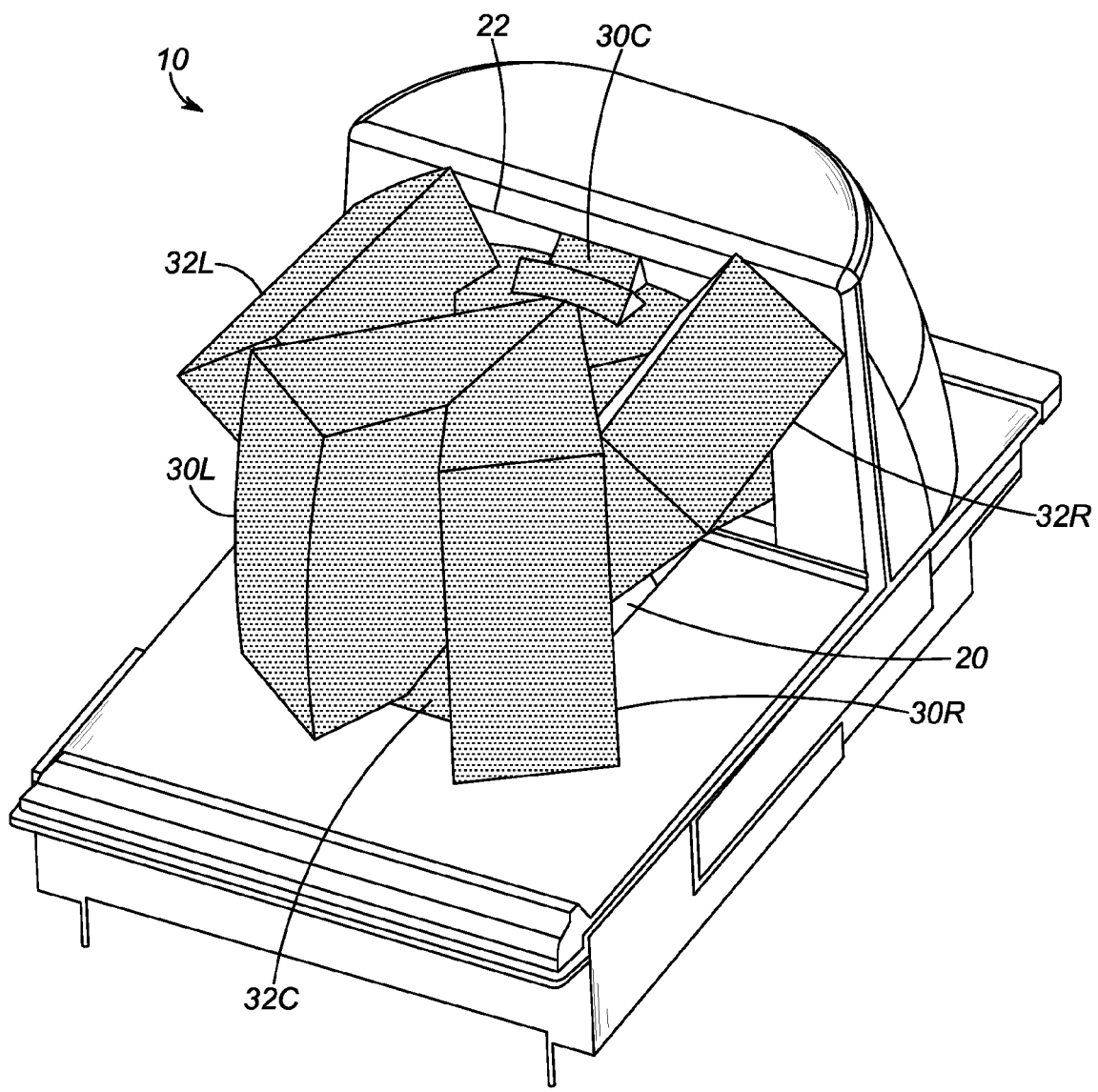
FIG. 13 is a perspective view of the workstation of FIG. 1 diagrammatically depicting all six subfields exteriorly of the windows.

An optical system is supported by the housing 16 and is operative for directing the captured return light along a first folded optical path from the upright window 22 to the vertical imaging sensor 30, and along a second folded optical path from the horizontal window 20 to the horizontal imaging sensor 32. As described in more detail below, the optical system is further operative for splitting the field of view of the vertical imaging sensor 30 into a plurality of subfields of view, namely a center subfield 30C flanked by two outer, right and left, subfields 30R, 30L, and for splitting the field of view of the horizontal imaging sensor 32 into a plurality of subfields of view, again a center subfield 32C flanked by two outer, right and left, subfields 32R, 32L. These various subfields outside of the windows 20, 22 are shown in FIG. 13.

The optical system has a plurality of fold mirrors each positioned in each of the first and second optical paths to fold the captured return light in the subfields of view. As shown in FIGS. 3-4, a first plurality of fold mirrors 40, 41, 42, 43 and 44 are positioned along a first optical path part between the vertical imaging sensor 30 and the upright window 22 to fold the captured return light in the outer subfield 30L to successively reflect off mirrors 44, 43, 42, 41 and 40, in that order, prior to being focused by the imaging lens assembly 34 onto the vertical imaging sensor 30. In analogous manner, a second plurality of fold mirrors 40, 45, 46, 47 and 48 are positioned along a second optical path part between the vertical imaging sensor 30 and the upright window 22 to fold the captured return light in the outer subfield 30R to successively reflect off mirrors 48, 47, 46, 45 and 40, in that order, prior to being focused by the imaging lens assembly 34 onto the vertical imaging sensor 30. A third plurality of fold mirrors 40, 49 and 50 are positioned along a third optical path part between the vertical imaging sensor 30 and the upright window 22 to fold the captured return light in the center subfield 30C to succes-sively reflect off mirrors 50, 49 and 40, in that order, prior to being focused by the imaging lens assembly 34 onto the vertical imaging sensor 30.

Figure 5:
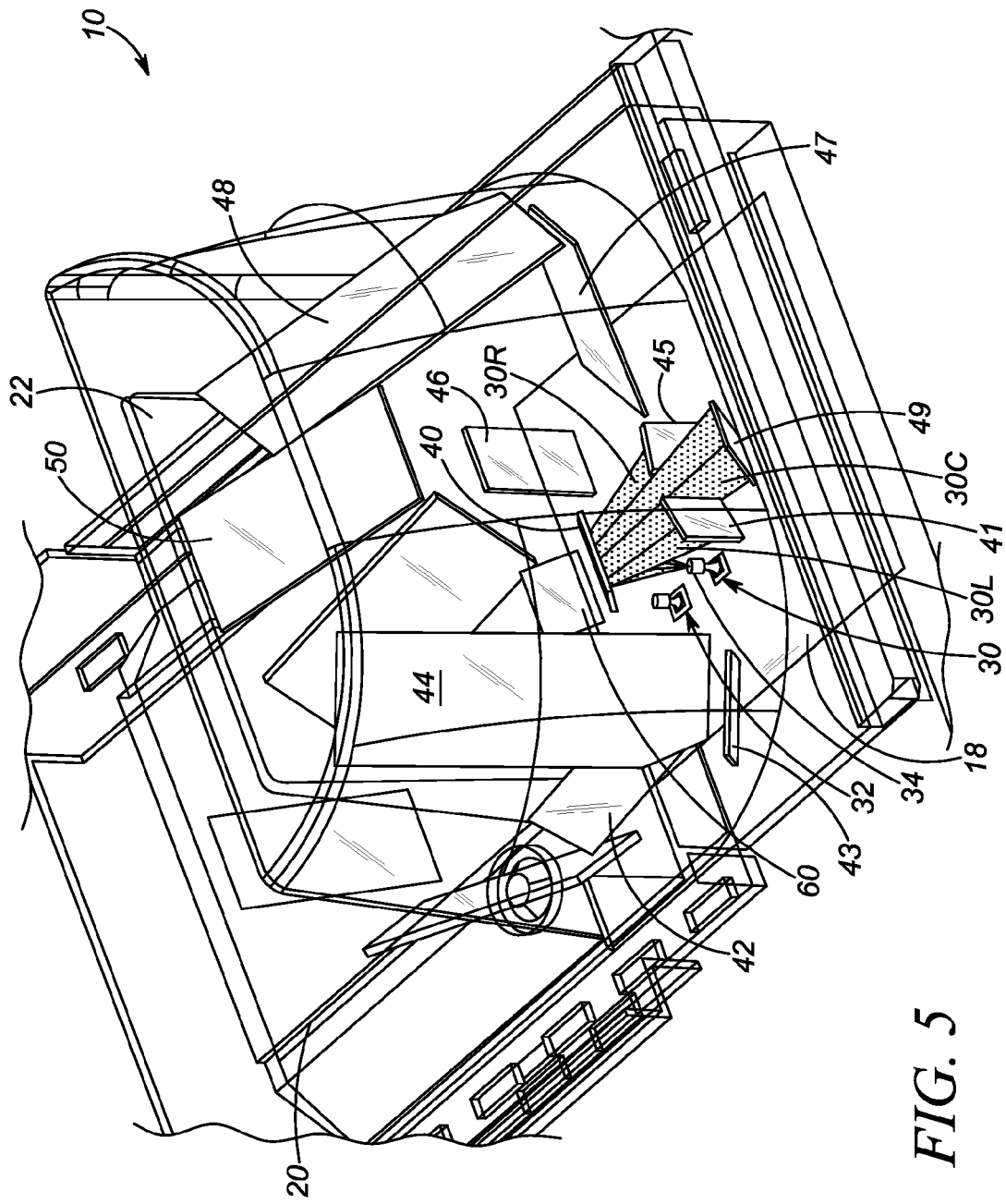
FIG. 5 is a rear perspective view of the optical system part of FIG. 3 depicting an optical splitter for splitting the field of view of the imaging sensor into a central subfield of view flanked by two outer subfields of view.
Figure 6:
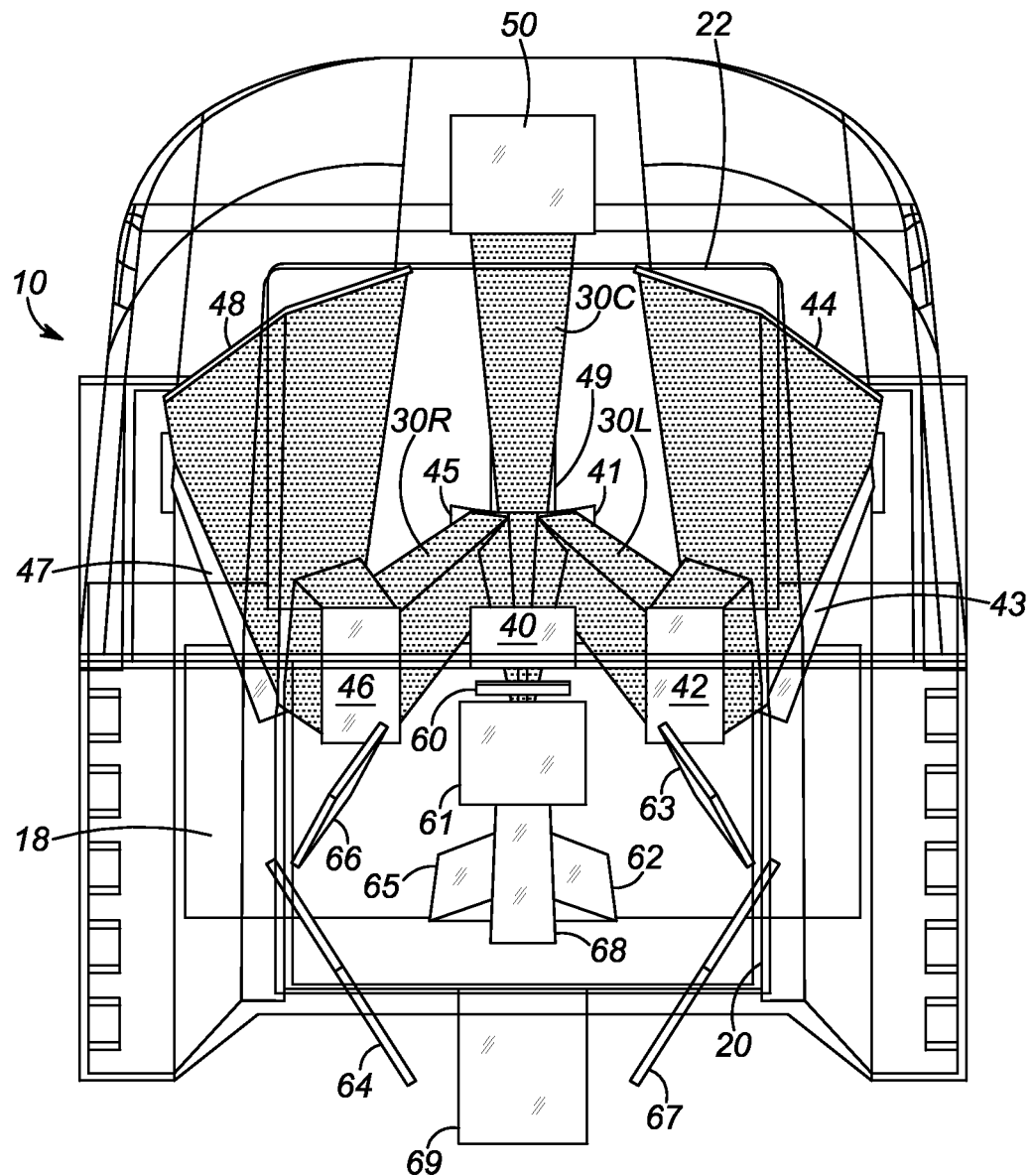
FIG. 6 is a top plan view of the optical system part of FIG. 3 diagrammatically depicting the subfields downstream of the optical splitter.
Figure 7:
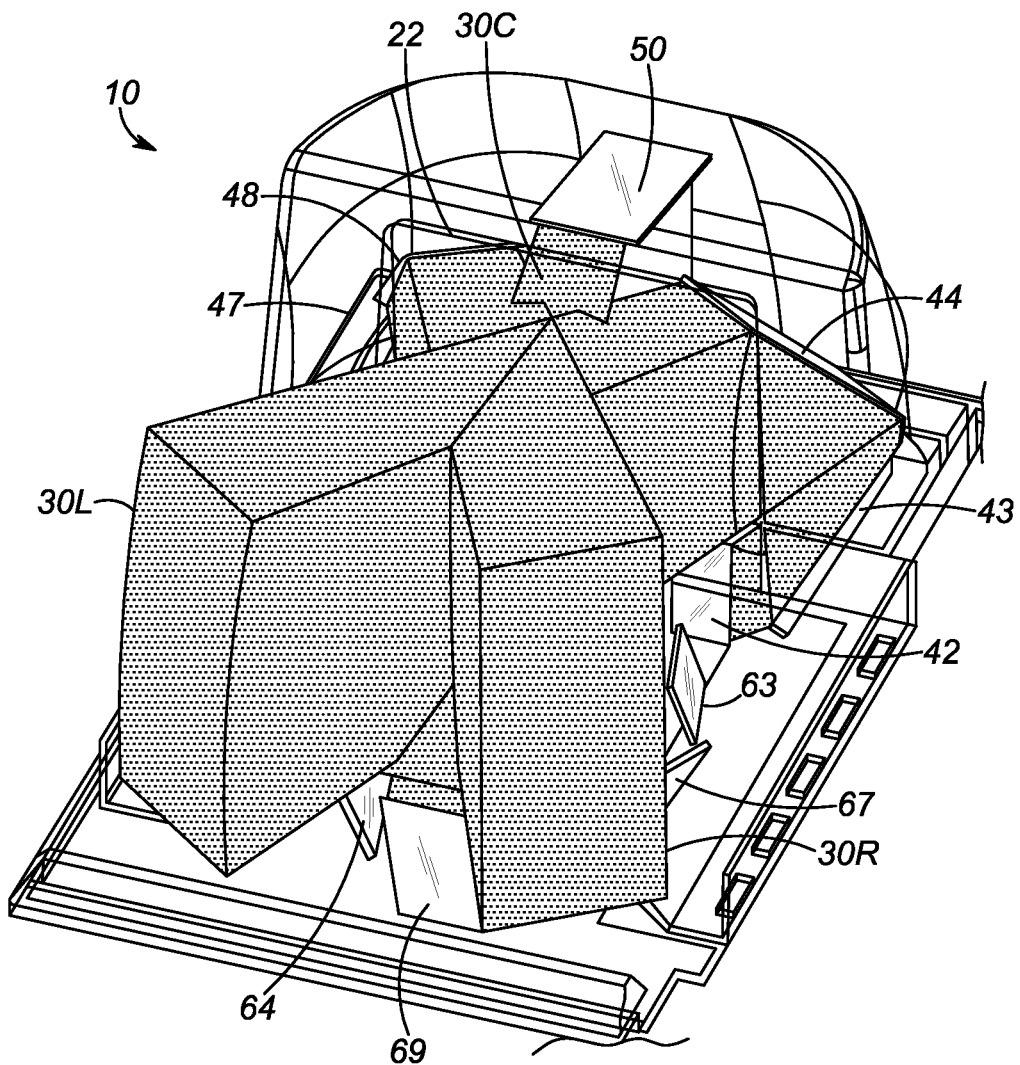
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the mirror 49 splits a central part of the field of view of the vertical imaging sensor 30 into the center subfield 30C, wherein the mirror 41 splits an outer part of the field of view of the vertical imaging sensor 30 into the outer subfield 30L, and wherein the mirror 45 splits another outer part of the field of view of the vertical imaging sensor 30 into the outer subfield 30R. FIG. 6 best depicts, as seen from above, the separate passage and folding of the outer subfield 30L between the mirrors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the mirror 44, and the separate passage and folding of the outer subfield 30R through the upright window 22 and onto the mirror 48.

The above discussion for FIGS. 3-7 dealt with the various fold mirrors of the optical system for folding and splitting the subfields 30C, 30L and 30R between the upright window 22 and the vertical imaging sensor 30. The following discussion of FIGS. 8-12 deals with additional fold mirrors of the optical system for folding and splitting additional subfields 32C, 32L and 32R between the horizontal window 20 and the horizontal imaging sensor 32.

Figure 8:
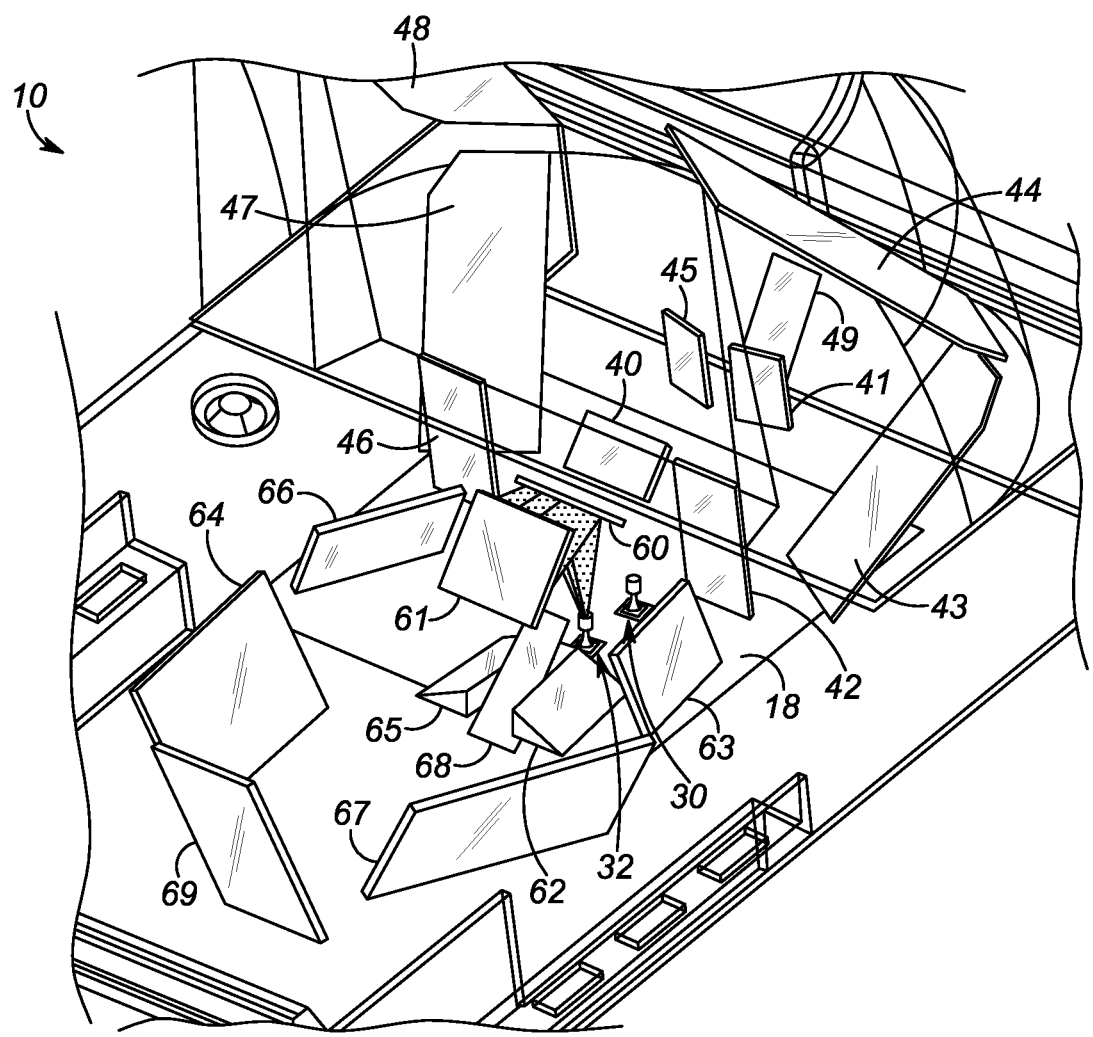
FIG. 8 is a broken-away, enlarged, perspective view of another part of the optical system in the workstation of FIG. 1 diagrammatically depicting part of another folded optical path of the field of view of another imaging sensor prior to reaching another optical splitter.
Figure 9:
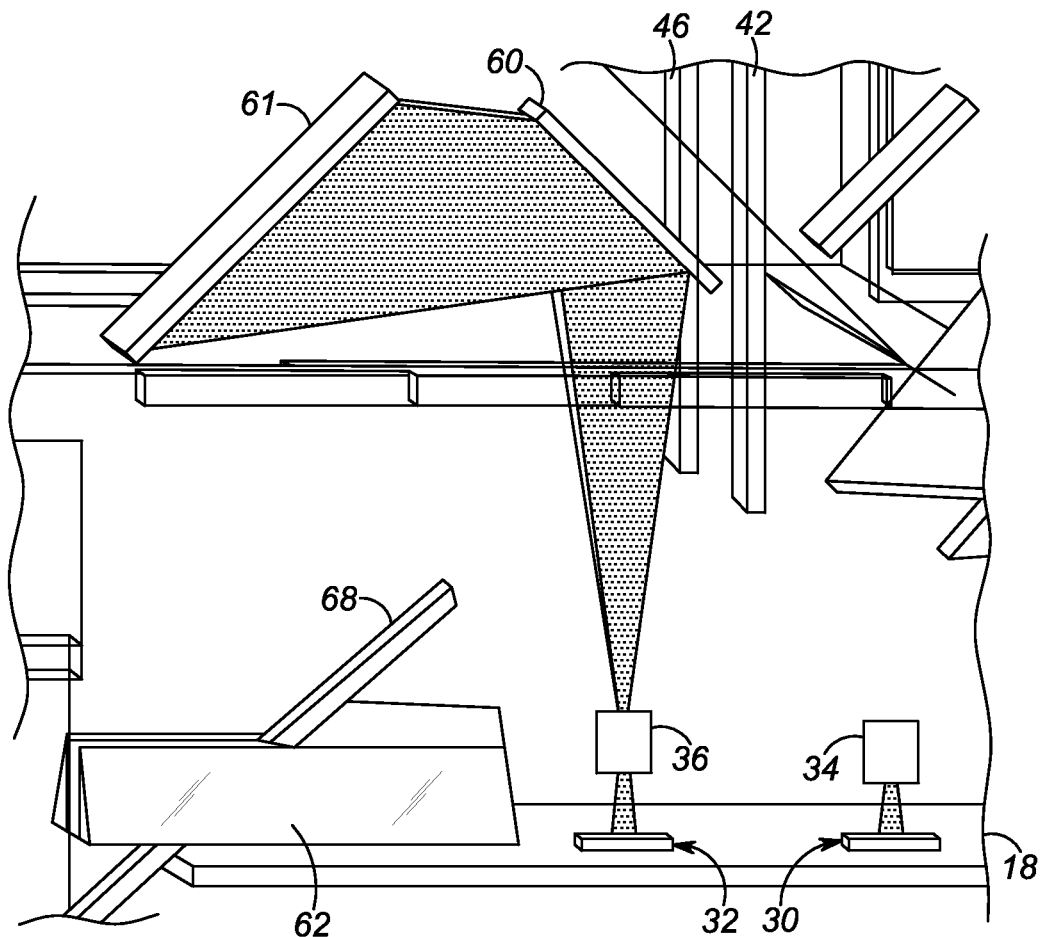
FIG. 9 is a side perspective, enlarged, view of the optical path part of FIG. 8.

Thus, the optical system, as best shown in FIGS. 8-9, includes a fourth plurality of fold mirrors 60, 61, 62, 63 and 64 that are positioned along a first optical path part between the horizontal imaging sensor 32 and the horizontal window 20 to fold the captured return light in the outer subfield 32R to successively reflect off mirrors 64, 63, 62, 61 and 60, in that order, prior to being focused by the imaging lens assembly 36 onto the horizontal imaging sensor 32. In analogous manner, a fifth plurality of fold mirrors 60, 61, 65, 66 and 67 are positioned along a second optical path part between the horizontal imaging sensor 32 and the horizontal window 20 to fold the captured return light in the outer subfield 32L to successively reflect off mirrors 67, 66, 65, 61 and 60, in that order, prior to being focused by the imaging lens assembly 36 onto the horizontal imaging sensor 32. A sixth plurality of fold mirrors 60, 61, 68 and 69 are positioned along a third optical path part between the horizontal imaging sensor 32 and the horizontal window 20 to fold the captured return light in the center subfield 32C to successively reflect off mirrors 69, 68, 61 and 60, in that order, prior to being focused by the imaging lens assembly 36 onto the horizontal imaging sensor 32.

The aforementioned mirrors 62, 65 and 68, as best seen in FIG. 8, comprise a second optical splitter, wherein the mirror 68 splits a central part of the field of view of the horizontal imaging sensor 32 into the center subfield 32C, wherein the mirror 62 splits an outer part of the field of view of the horizontal imaging sensor 32 into the outer subfield 32R, and wherein the mirror 65 splits another outer part of the field of view of the horizontal imaging sensor 32 into the outer subfield 32L.

Figure 10:
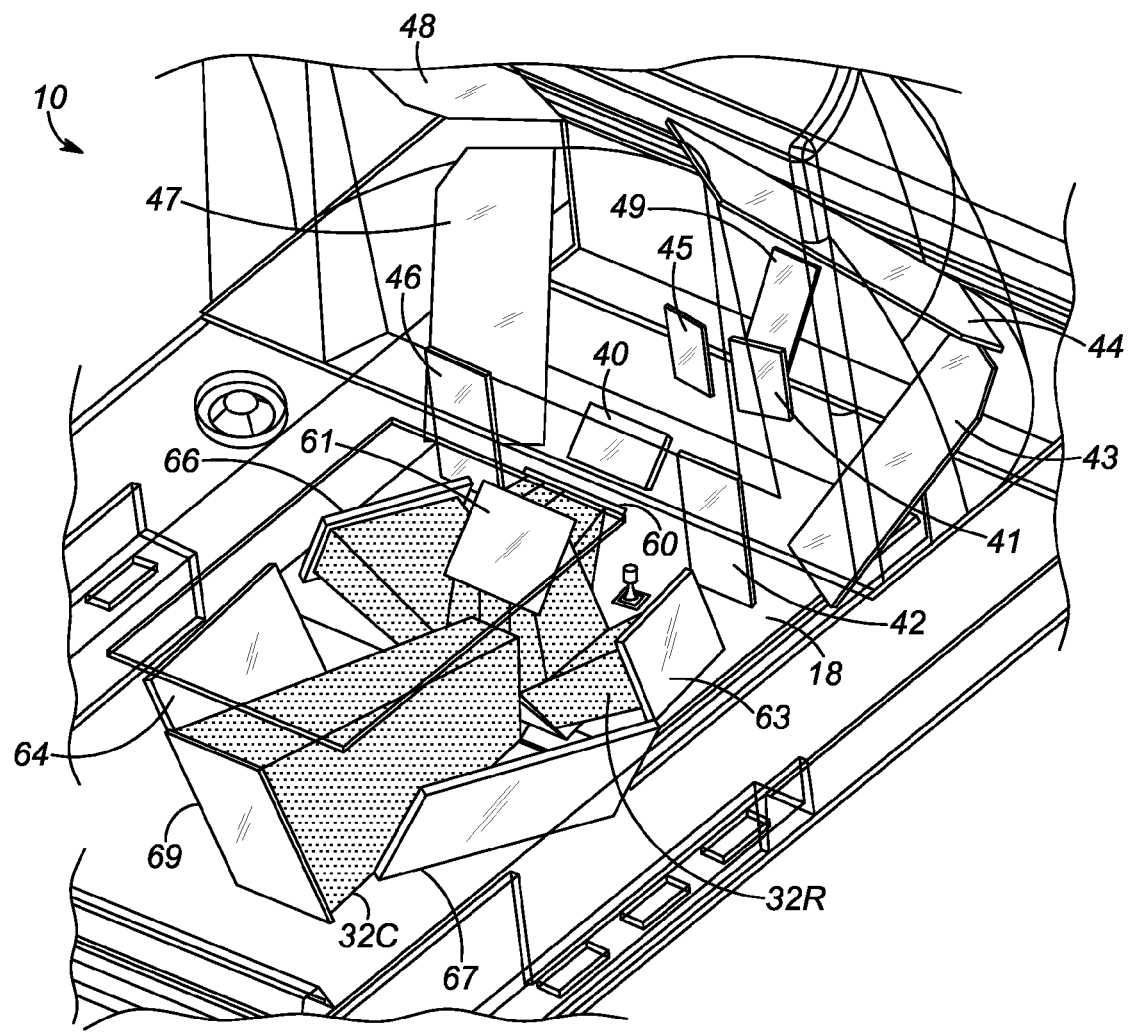
FIG. 10 is a perspective view diagrammatically depicting the subfields downstream of the optical splitter of FIG. 8.
Figure 11:
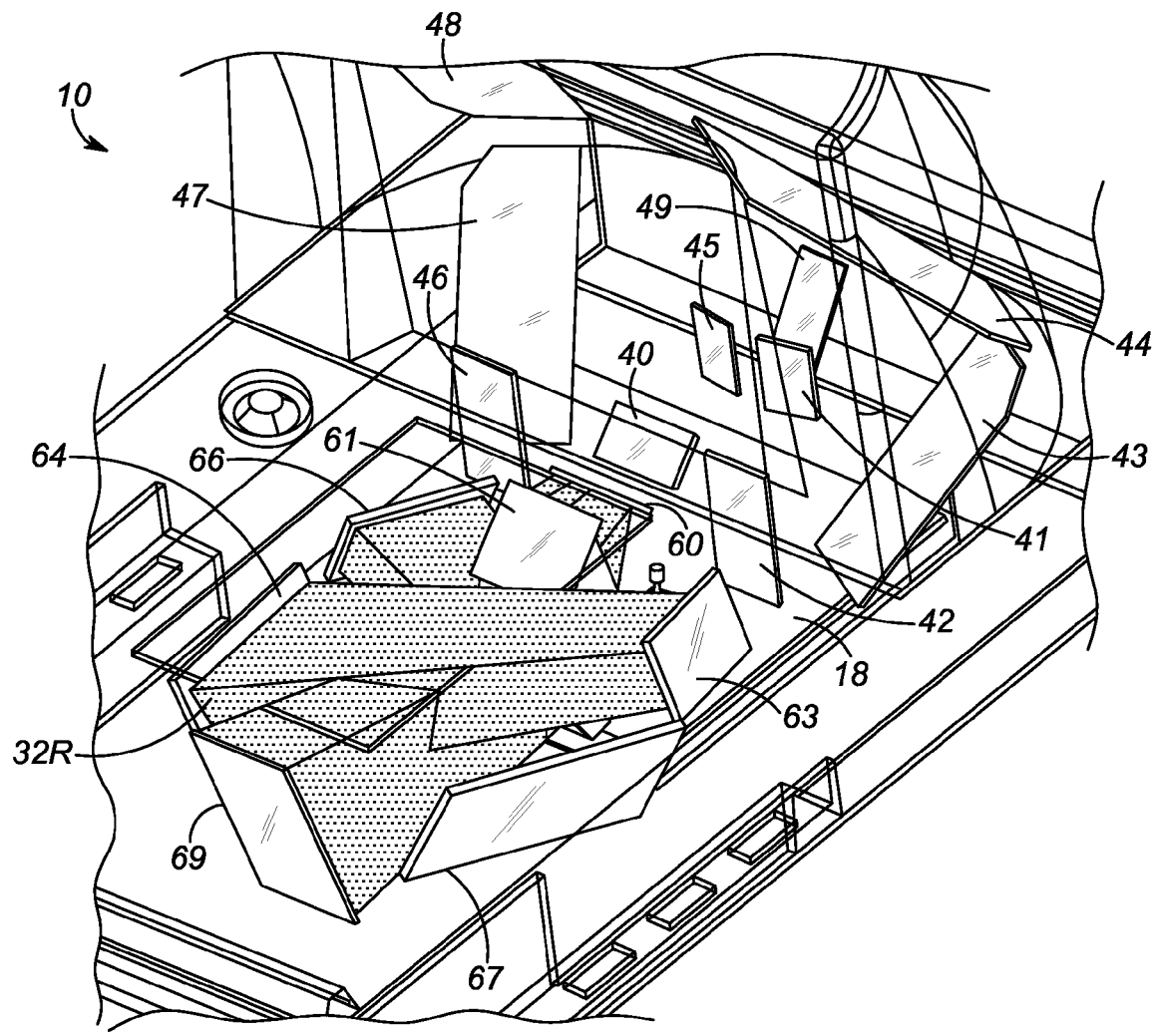
FIG. 11 is a perspective view diagrammatically depicting the subfields still further downstream of the optical splitter of FIG. 8.
Figure 12:
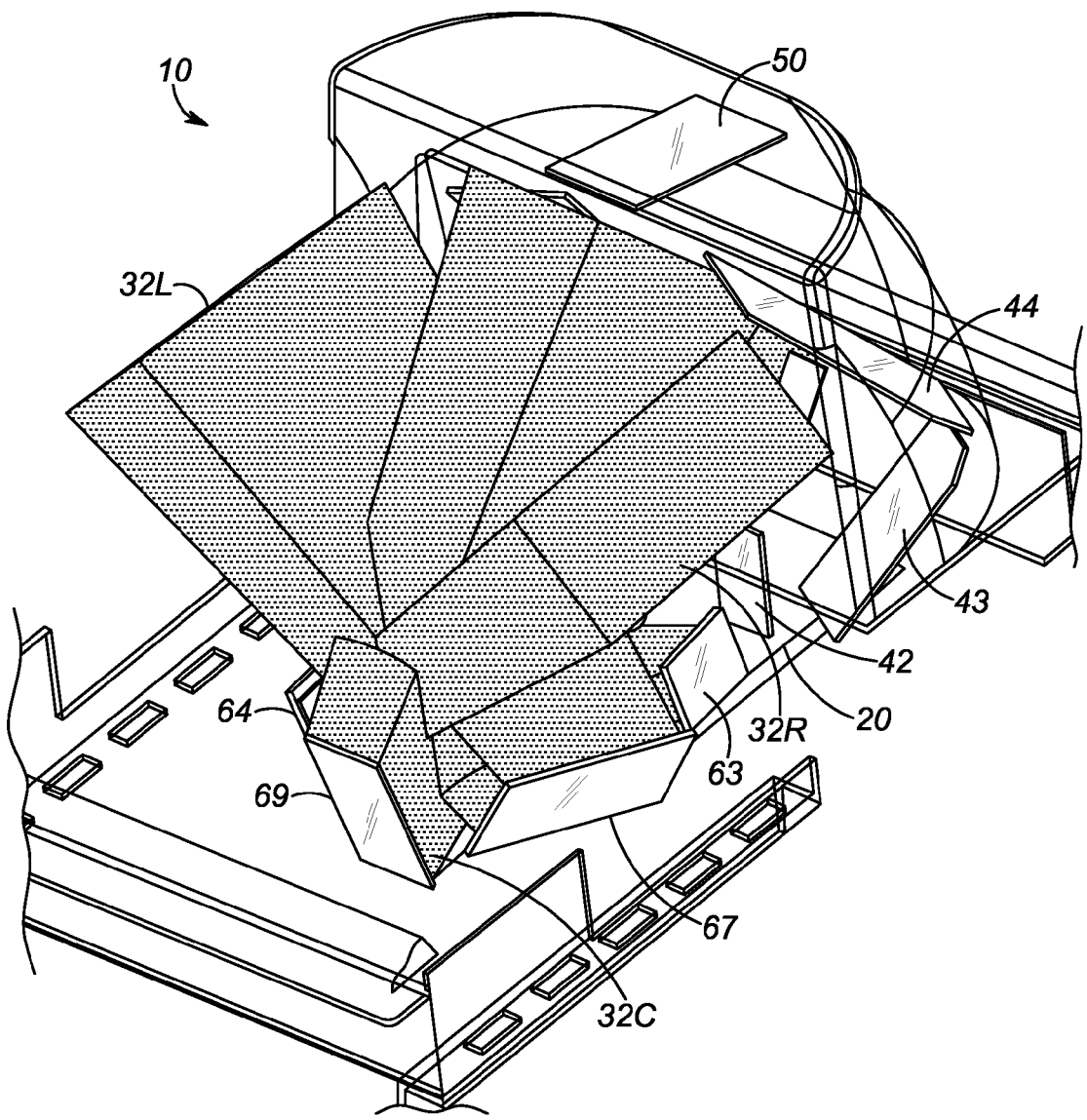
FIG. 12 is a perspective view of the other optical system part of FIG. 8 diagrammatically depicting three subfields exteriorly of the horizontal window of the workstation of FIG. 1.

FIG. 9 best depicts the folding of all three subfields between the mirrors 61 and 60 and the horizontal imaging sensor 32 away from the second optical splitter 62, 65 and 68. FIG. 10 best depicts the separate passage and folding of the outer subfield 32R between the mirrors 62 and 63, and also depicts the separate passage and folding of the outer subfield 32L between the mirrors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the mirrors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the mirror 67, and the separate passage and folding of the central subfield 32C through the horizontal window 20 and onto the mirror 69.

The use of the aforementioned two optical splitters reduces the number of imaging sensors in the workstation 10. Thus, only two imaging sensors 30, 32 are preferably needed to produce the six subfields 30C, 30L, 30R, 32C, 32L and 32R depicted in FIG. 13. These six subfields provide optimum visibility of indicia 14 on the various sides of the product 12 being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users.

As best seen in FIG. 14, energizable illuminators 70C1, 70C2 are mounted in spaced-apart elation rearwardly on board 18 for illuminating central subfield 30C; energizable illuminator 70R is mounted rearwardly on board 18 for illuminating outer subfield 30R; and energizable illuminator 70L is mounted rearwardly on board 18 for illuminating outer subfield 30L. Each illuminator is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). The imaging lens assembly 34 is operative for capturing the illumination light returned from the indicia in each subfield 30C, 30R and 30L along respective optical paths from the upright window 22 to the vertical imaging sensor 30. Non-illustrated illumination lenses overlie each illuminator to shape the outgoing illumination light and insure that the illumination light substantially fills the subfields 30C, 30R and 30L.

Figure 15:
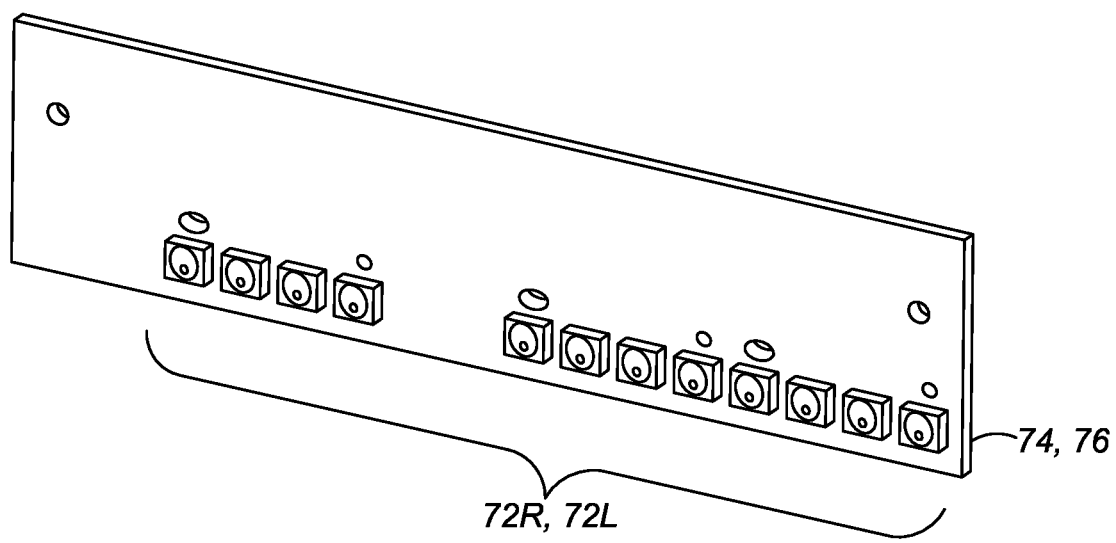
FIG. 15 is a perspective view of an illuminator and an exposure sensor commonly mounted on an auxiliary printed circuit board within the workstation of FIG. 1 in accordance with this invention.
Figure 16:
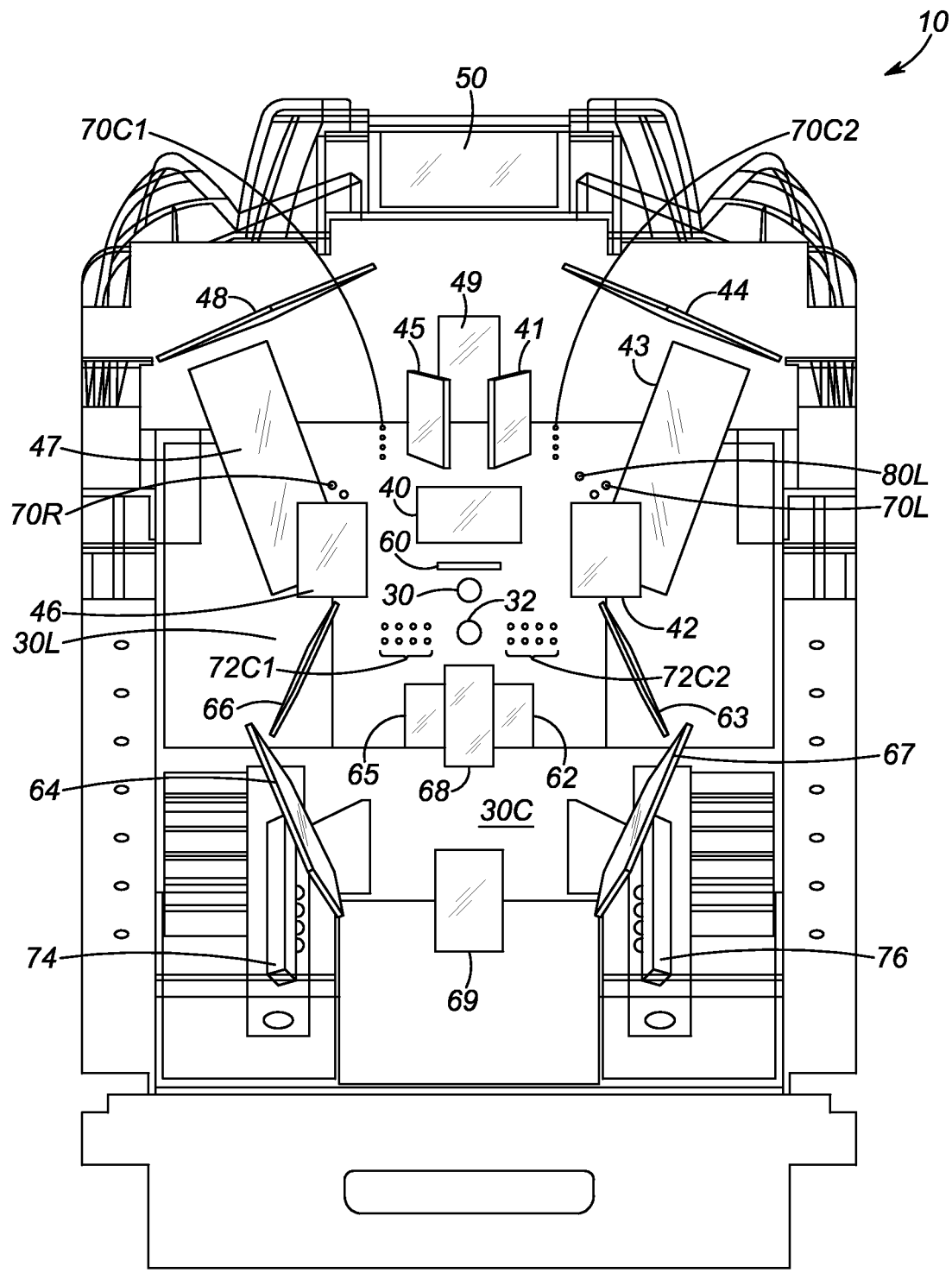
FIG. 16 is a top perspective view of the workstation of FIG. 1.

Analogously, as also seen in FIG. 14, energizable illuminators 72C1, 72C2 are mounted in spaced-apart relation forwardly on board 18 for illuminating central subfield 32C. Energizable illuminator 72R is mounted on an auxiliary printed circuit board 74 (shown in isolation in FIG. 15) for illuminating outer subfield 32R; and energizable illuminator 72L is mounted rearwardly on another auxiliary board 76 (again, see FIG. 15) for illuminating outer subfield 32L. FIG. 16 is an overhead view that shows the placement of the auxiliary boards 74, 76. Analogously to that described above, each illuminator 72C1, 72C2, 72R and 72L is operative for illuminating its respective subfield with illumination light over an adjustable illumination time, preferably in a range of about 0.25 to about 0.75 milliseconds. Each illuminator preferably includes multiple illumination light sources, e.g., surface-mounted light emitting diodes (LEDs). FIG. 15 shows such LEDs 72R or 72L on an enlarged scale. The imaging lens assembly 36 is operative for capturing the illumination light returned from the indicia in each subfield 32C, 32R and 32L along respective optical paths from the horizontal window 22 to the horizontal imaging sensor 32. Non-illustrated illumination lenses overlie each illuminator to shape the outgoing illumination light and insure that the illumination light substantially fills the subfields 32C, 32R and 32L.

In use, an operator, such as a person working at a supermarket checkout counter, or a customer in a self checkout stand, processes the product 12 bearing the UPC symbol 14 thereon, past the windows 20, 22 by swiping the product 12 across a respective window, or by presenting the product 12 at the respective window. The symbol 14 may located on any of the top, bottom, right, left, front and rear, sides of the product 12, and at least one, or perhaps both, of the imagers 30, 32 will capture the illumination light reflected, scattered, or otherwise returning from the symbol 14 through one or both windows 20, 22. All three of the subfields 32C, 32R and 32L pass through the horizontal window 20 along different intersecting directions to read three sides of the product. All three of the subfields 30C, 30R and 30L pass through the upright window 22 along different intersecting directions to read three more sides of the product. As shown in FIG. 13, the six subfields substantially fully occupy the scan zone. All six subfields are individually illuminated by their dedicated illuminators.

As shown in FIG. 16, the LED illumination arrays 76 and 77 are placed inside the housing interior but close to the horizontal window 20 and orientated respectively to cover the subfields 32L and 32R. Such illumination layout with the LED sources having short internal path provides significant advantages of power efficiency. However, such illumination layout also requires the system to handle a large illumination dynamic range between the near read end (the regions near the horizontal window 20) and the far read end (the regions near the top of the vertical tower). In addition, as shown in FIG. 12, when the subfields 32C, 32R and 32L pass through the horizontal window 20 along different intersecting directions, the three horizontal illumination FOVs cover each of the subfields 32C, 32R and 32L also pass through the horizontal window along similar directions. These three horizontal illumination FOVs overlap near the horizontal window and separate as they propagate away from the horizontal window. Consequently, the illumination intensity in the regions near the horizontal window 20 can be significantly higher than that in the regions near the top of the vertical tower further away from the horizontal window 20, when multiple horizontal illumination FOVs are turned on with overlapped time periods. In any of these situations, if the illumination pulses are long enough to ensure signal to noise ratio (SNR) to read at the far end regions, the overlap regions on or near the horizontal window would be saturated; a barcode in the overlap region would scatter excess amount of light to blind the imager and consequently not read. On the other hand, if the illumination pulses are set short to ensure no saturation in the overlap regions near the scan window, the far end regions would not have enough SNR to read barcode.

When a global shutter is used to expose the array of photodetecting elements in the horizontal imager 32 for a predetermined exposure time, the effective exposure level for the captured image in each of the subfields 32C, 32R and 32L can be respectively controlled by changing the overlapped-pulse-duration within the predetermined exposure time for each corresponding horizontal illumination FOVs. To increase the illumination dynamic range to cover the near read end (the regions near the horizontal window 20) and the far read end (the regions near the top of the vertical tower) for any particular FOV, a short overlapped-pulse-duration of the illumination FOV within the predetermined exposure time and a long overlapped pulse-duration of the illumination FOV within the predetermined exposure time for this particular FOV can be altered.

Figure 17:
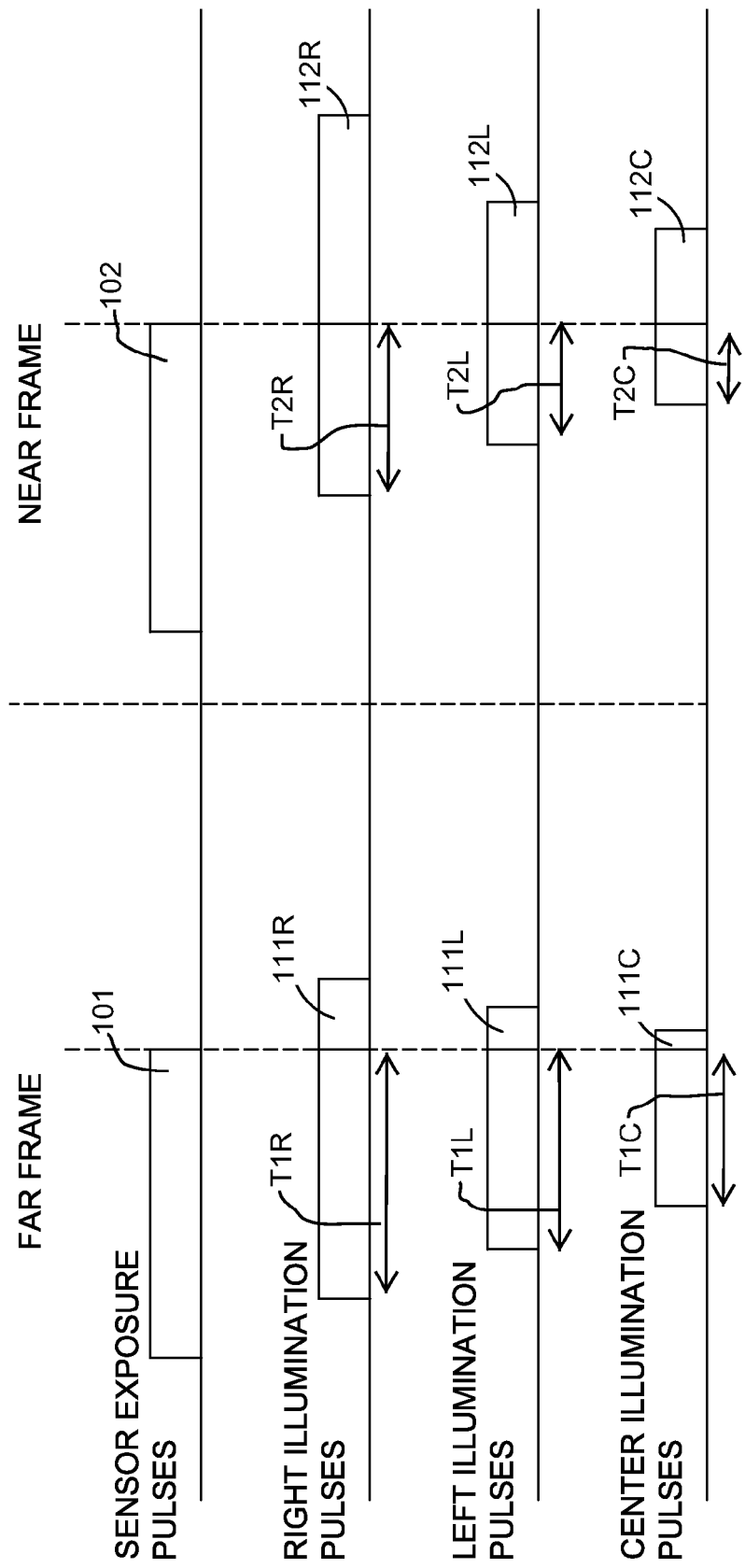
FIG. 17 shows that the long and short Illumination Pulse Phase Shifts (IPPSs) of each FOV are altered.

In one implementation as shown FIG. 17, the long and short Illumination Pulse Phase Shifts (IPPSs) of each FOV are altered; consequently, a short overlapped-pulse-duration of each illumination FOV within the predetermined exposure time and a long overlapped-pulse-duration of each illumination FOV within the predetermined exposure time are alternated every other frame for the case. In this implementation, the sensor shared by the left, right and center image FOVs is set to fixed exposure time and gain from frame to frame, and each of the three illuminations has fixed illumination pulses for all the frames. On the other hand, each of the three illuminations is shifted relatively to the sensor exposure pulses such that for each FOV the frame with the short IPPS provides enough signal for the far end reading of the respective FOV and is thus called the far frame. In the meantime the frame with the long IPPS prevents saturation in the overlap regions of different FOVs at or near the scan windows and is thus called the near frame. In manufacture for each FOV the short IPPSs can be calibrated for aggressive far end reading of the respective FOV by placing a white diffusive target at the desired reading end for the necessary white counts. And the long IPPSs for each FOV can be calibrated to avoid the saturation in the overlap regions of different FOVs by placing a white diffusive target at the respective overlap regions. The long and short IPPSs for each FOV can be the same or different depending on the optomechanical variations of the individual illumination systems and the reading requirements of each FOV.

Figure 18:
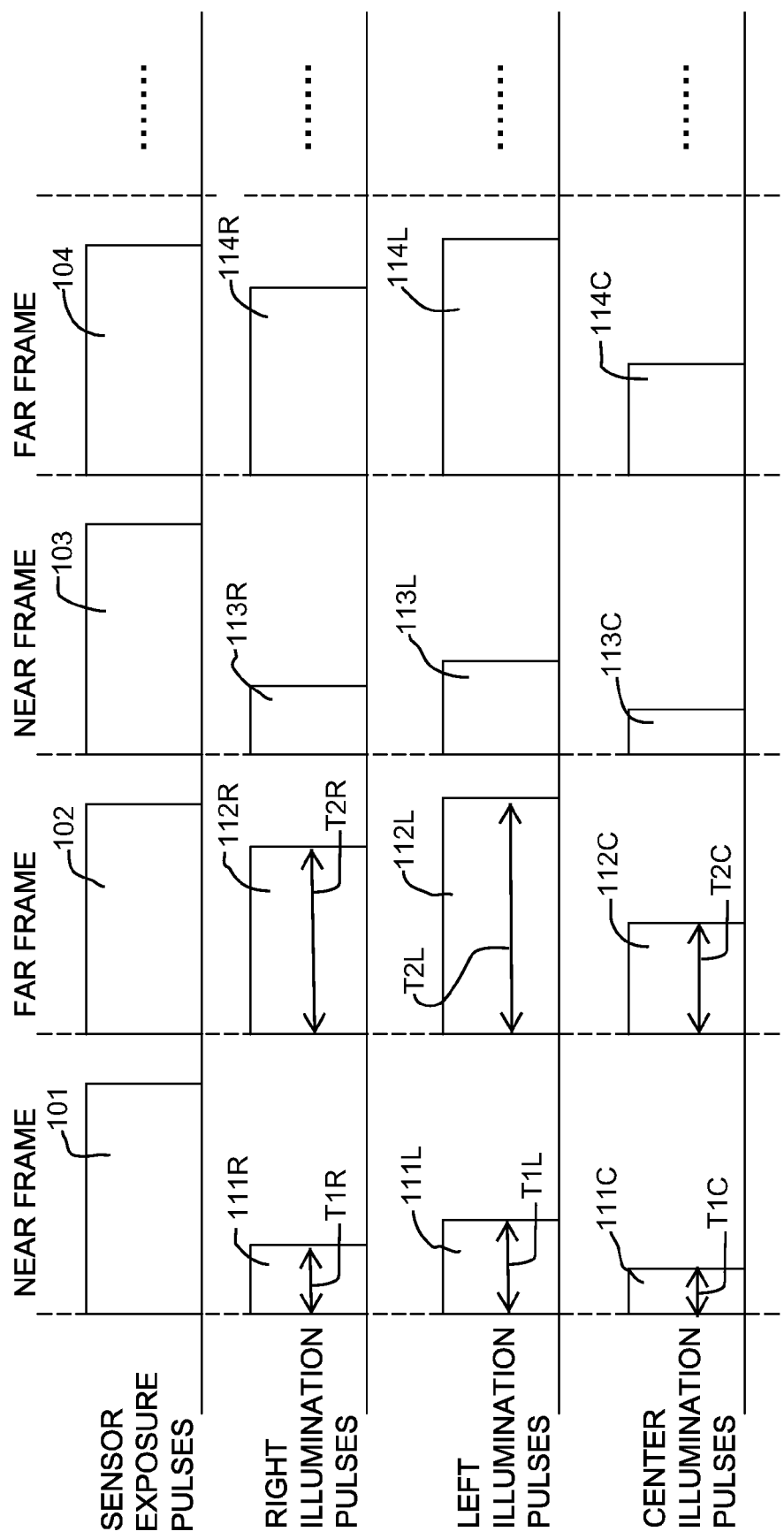
FIG. 18 shows that each of the three illuminations alternates the long and short Illumination Pulses every other frame.

In another implementation as shown FIG. 18, the sensor shared by the left, right and center image FOVs is set to fixed exposure time and gain from frame to frame, and each of the three illuminations alternates the long and short Illumination Pulses (IPs) every other frame. And for each FOV the frame with the long IPs provides enough signal for the far end reading for the respective FOV and is thus called the far frame. In the meantime the frame with the short IPs prevents saturation in the overlap regions of different FOVs at or near the scan windows and is thus called the near frame. In manufacture for each FOV the long IPs can be calibrated for aggressive far end reading of the respective FOV by placing a white diffusive target at the desired reading end for the necessary white counts. And for each FOV the short IPs can be calibrated to avoid the saturation in the overlap regions of different FOVs by placing a white diffusive target at the respective overlap region. The long and short IPs for each FOV can be the same or different depending on the optomechanical variations of the individual illumination systems and the reading requirements of each FOV.

In still other implementations, two short IPPSs and one long IPPS or two long IPs and one short IP can be alternated if the far end reading is more important or two long IPPSs and one short IPPS or two short IPs and one long IP can be alternated if the overlap regions near the scan windows are more important. In some implementations, the sensor shared by multiple FOVs can set to different sensor exposure times and/or sensor gain for the near and far frame.

It will be understood that each of the elements described above, or two or more together, also may find a useful application in other types of constructions differing from the types described above. For example, when a global shutter is used to expose the array of photo-detecting elements in the vertical imager 30 for a predetermined exposure time, the effective exposure level for the captured image in each of the subfields 30C, 30R and 30L can be respectively controlled by changing the overlapped-pulse-duration within the predetermined exposure time or the illumination pulse duration for each corresponding vertical illumination FOVs. The illumination dynamic range between the near read end (the regions near the vertical window 22) and the far read end (the regions near the end and the edge of the platter) for any particular FOV can also be increased with methods similar to what is described above.

In general, the method for controlling a workstation as described in instant disclosure can include the following: (1) energizing a first illuminator to illuminate a first subfield of view with a first illumination pulse and subsequently energizing the first illuminator to illuminate the first subfield of view with a second illumination pulse; (2) energizing a second illuminator to illuminate a second subfield of view with a third illumination pulse and subsequently energizing the second illuminator to illuminate the second subfield of view with a fourth illumination pulse, the first subfield of view and the second subfield of view being split from the field of view of the imaging sensor; (3) reflecting returned light entering the first subfield of view to impinge upon a first group of the photosensitive elements in the imaging sensor and concurrently reflecting returned light entering the second subfield of view to impinge upon a second group of the photosensitive elements in the imaging sensor; (4) exposing the array of photosensitive elements in the imaging sensor for a first sensor-exposure time and subsequently exposing the array of photosensitive elements in the imaging sensor for a second sensor-exposure time; and (5) processing an image captured by the imaging sensor to decode a barcode in the image. In this described method, the first illumination pulse overlaps with the first sensor-exposure time for a first overlapped-pulse-duration, and the second illumination pulse overlaps with the second sensor-exposure time for a second overlapped-pulse-duration, with the first overlapped-pulse-duration being different from the second overlapped-pulse-duration; additionally, the third illumination pulse overlaps with the first sensor-exposure time for a third overlapped-pulse-duration, and the fourth illumination pulse overlaps with the second sensor-exposure time for a fourth overlapped-pulse-duration, with the third overlapped-pulse-duration being different from the fourth overlapped-pulse-duration.

In some implementations as shown in FIGS. 17-18 and FIGS. 13-16, the method for controlling the workstation can includes energizing a first illuminator 72R to illuminate a first subfield of view 32R with a first illumination pulse 111R and subsequently energizing the first illuminator 72R to illuminate the first subfield of view 32R with a second illumination pulse 112R. Such method also includes energizing a second illuminator 72L to illuminate a second subfield of view 32L with a third illumination pulse 111L and subsequently energizing the second illuminator 72L to illuminate the second subfield of view 32L with a fourth illumination pulse 112L. Such method still includes exposing the array of photosensitive elements in the imaging sensor 32 for a first sensor-exposure time 101 and subsequently exposing the array of photosensitive elements in the imaging sensor 32 for a second sensor-exposure time 102. In some implementations as shown in FIGS. 17-18, the first sensor-exposure time 101 and the second sensor-exposure time 102 are substantially identical; in other implementations, however, the first sensor-exposure time 101 and the second sensor-exposure time 102 can be different.

In some implementations as shown in FIGS. 17-18, the first illumination pulse 111R overlaps with the first sensor-exposure time 101 for a first overlapped-pulse-duration T1R, and the second illumination pulse 112R overlaps with the second sensor-exposure time 102 for a second overlapped-pulse-duration T2R. Additionally, the third illumination pulse 111L overlaps with the first sensor-exposure time 101 for a third overlapped-pulse-duration T1L, and the fourth illumination pulse 112L overlaps with the second sensor-exposure time 102 for a fourth overlapped-pulse-duration T2L. In FIGS. 17-18, the first overlapped-pulse-duration T1R is different from the second overlapped-pulse-duration T2R, and the third overlapped-pulse-duration T1L is different from the fourth overlapped-pulse-duration T2L.

In some implementations as shown in FIG. 18, the duration of the first illumination pulse 111R is different from the duration of the second illumination pulse 112R, and the duration of the third illumination pulse 111L is different from the duration of the second illumination pulse 112L.

In other implementations as shown in FIG. 17, the duration of the first illumination pulse 111R can be substantially identical to the duration of the second illumination pulse 112R. But, because the delay measured from the beginning of the first sensor-exposure time 101 to the beginning of the first illumination pulse 111R is different from the delay measured from the beginning of the second sensor-exposure time 102 to the beginning of the second illumination pulse 112R, the first overlapped-pulse-duration T1R can be different from the second overlapped-pulse-duration T2R. Similarly, in FIG. 17, despite that the duration of the third illumination pulse 111L is substantially identical to the duration of the second illumination pulse 112L, the third overlapped-pulse-duration T1L can still be different from the fourth overlapped-pulse-duration T2L, because of the differences in pulse delays.

In some implementations, the imaging sensor is maintained at a first sensor gain while the array of photosensitive elements in the imaging sensor is exposed for the first sensor-exposure time 101, and the imaging sensor is maintained at a second sensor gain while subsequently exposing the array of photosensitive elements in the imaging sensor for the second sensor-exposure time 102. In some implementations, the first sensor gain can be substantially identical to the second sensor gain. In other implementations, however, the first sensor gain can be different from the second sensor gain.

While the invention has been illustrated and described as embodied in a workstation for electro-optically reading indicia by using two imaging sensors, it is not intended to be limited to the details shown, since various modifications and structural changes may be made without departing in any way from the spirit of the present invention. For example, the workstation can have more than two imaging sensors. The workstation can have more than two windows.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A workstation comprising:
   a housing;
   at least one window supported by the housing;
   at least one imaging sensor supported by the housing and having an array of photosensitive elements with a field of view;
   an optical system supported by the housing and operative for splitting the field of view of the at least one imaging sensor into a plurality of subfields of view that simultaneously extend through the at least one window;
   a plurality of energizable illuminators each configured to illuminate a corresponding subfield of view with illumination light; and
   a controller operatively connected to the at least one imaging sensor and at least one illuminator, operative to energize the at least one illuminator to illuminate the corresponding subfield of view with a first illumination pulse and to expose the array of photosensitive elements for a first sensor-exposure time, and operative to energize the at least one illuminator to illuminate the corresponding subfield of view subsequently with a second illumination pulse and to expose the array of photosensitive elements for a second sensor-exposure time, wherein the first illumination pulse overlaps with the first sensor-exposure time for a first overlapped-pulse-duration, and the second illumination pulse overlaps with the second sensor-exposure time for a second overlapped-pulse-duration, with the first overlapped-pulse-duration being different from the second overlapped-pulse-duration.

2. The workstation of claim 1, wherein the controller is further operative to process an image captured by the at least one imaging sensor to decode a barcode in the image.

3. The workstation of claim 1, wherein the first sensor-exposure time is substantially identical to the second sensor-exposure time.

4. The workstation of claim 1, wherein the first sensor-exposure time is different from the second sensor-exposure time.

5. The workstation of claim 1, wherein the duration of the first illumination pulse is different from the duration of the second illumination pulse.

6. The workstation of claim 1, wherein the duration of the first illumination pulse is substantially identical to the duration of the second illumination pulse.

7. The workstation of claim 1, wherein the duration of the first illumination pulse is substantially identical to the duration of the second illumination pulse, and the delay measured from the beginning of the first sensor-exposure time to the beginning of the first illumination pulse is different from the delay measured from the beginning of the second sensor-exposure time to the beginning of the second illumination pulse.

8. The workstation of claim 1, wherein the at least one window is located in an upright plane; and further comprising another window located in a generally horizontal plane that intersects the upright plane, and another imaging sensor supported by the housing and having another array of photosensitive elements with another field of view.

9. The workstation of claim 8, wherein the optical system includes a first optical splitter for splitting the field of view of the at least one imaging sensor into multiple subfields of view that pass through the at least one window, and a second optical splitter for splitting the other field of view of the other imaging sensor into multiple subfields of view that pass through the other window.

10. The workstation of claim 1, wherein the at least one imaging sensor is maintained at a first sensor gain while the array of photosensitive elements is exposed for the first sensor-exposure time and is maintained at a second sensor gain while the array of photosensitive elements is exposed for the second sensor-exposure time; and
    wherein the first sensor gain is different from the second sensor gain.

11. A method for controlling a workstation that includes an imaging sensor having an array of photosensitive elements with a field of view, the method comprising:
    energizing a first illuminator to illuminate a first subfield of view with a first illumination pulse and subsequently energizing the first illuminator to illuminate the first subfield of view with a second illumination pulse;
    energizing a second illuminator to illuminate a second subfield of view with a third illumination pulse and subsequently energizing the second illuminator to illuminate the second subfield of view with a fourth illumination pulse, the first subfield of view and the second subfield of view being split from the field of view of the imaging sensor;
    reflecting returned light entering the first subfield of view to impinge upon a first group of the photosensitive elements in the imaging sensor and concurrently reflecting returned light entering the second subfield of view to impinge upon a second group of the photosensitive elements in the imaging sensor;
    exposing the array of photosensitive elements in the imaging sensor for a first sensor-exposure time and subsequently exposing the array of photosensitive elements in the imaging sensor for a second sensor-exposure time;
    processing an image captured by the imaging sensor to decode a barcode in the image;
    wherein the first illumination pulse overlaps with the first sensor-exposure time for a first overlapped-pulse-duration, and the second illumination pulse overlaps with the second sensor-exposure time for a second overlapped-pulse-duration, with the first overlapped-pulse-duration being different from the second overlapped-pulse-duration; and
    wherein the third illumination pulse overlaps with the first sensor-exposure time for a third overlapped-pulse-duration, and the fourth illumination pulse overlaps with the second sensor-exposure time for a fourth overlapped-pulse-duration, with the third overlapped-pulse-duration being different from the fourth overlapped-pulse-duration.

12. The method of claim 11, wherein the first sensor-exposure time is substantially identical to the second sensor-exposure time.

13. The method of claim 11, wherein the first sensor-exposure time is different from the second sensor-exposure time.

14. The method of claim 11, wherein the duration of the first illumination pulse is different from the duration of the second illumination pulse.

15. The method of claim 11, wherein the duration of the first illumination pulse is substantially identical to the duration of the second illumination pulse.

16. The method of claim 11, wherein the duration of the first illumination pulse is substantially identical to the duration of the second illumination pulse, and the delay measured from the beginning of the first sensor-exposure time to the beginning of the first illumination pulse is different from the delay measured from the beginning of the second sensor-exposure time to the beginning of the second illumination pulse.

17. The method of claim 11, wherein the duration of the third illumination pulse is different from the duration of the fourth illumination pulse.

18. The method of claim 11, wherein the duration of the third illumination pulse is substantially identical to the duration of the fourth illumination pulse.

19. The method of claim 11, further comprising:
maintaining the imaging sensor at a first sensor gain while exposing the array of photosensitive elements in the imaging sensor for the first sensor-exposure time;
maintaining the imaging sensor at a second sensor gain while subsequently exposing the array of photosensitive elements in the imaging sensor for the second sensor-exposure time; and
wherein the first sensor gain is substantially identical to the second sensor gain.

20. The method of claim 11, further comprising:
maintaining the imaging sensor at a first sensor gain while exposing the array of photosensitive elements in the imaging sensor for the first sensor-exposure time;
maintaining the imaging sensor at a second sensor gain while subsequently exposing the array of photosensitive elements in the imaging sensor for the second sensor-exposure time; and
wherein the first sensor gain is different from the second sensor gain.

* * * * *